(12) United States Patent
Shao et al.

(10) Patent No.: US 10,949,703 B2
(45) Date of Patent: Mar. 16, 2021

(54) METHOD AND SYSTEM OF EXTRACTION OF IMPERVIOUS SURFACE OF REMOTE SENSING IMAGE

(71) Applicant: Wuhan University, Wuhan (CN)

(72) Inventors: Zhenfeng Shao, Wuhan (CN); Lei Wang, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 55 days.

(21) Appl. No.: 16/519,028

(22) Filed: Jul. 23, 2019

(65) Prior Publication Data
US 2020/0026953 A1    Jan. 23, 2020

(30) Foreign Application Priority Data

Jul. 23, 2018 (CN) .......................... 201810809896.6

(51) Int. Cl.
| | |
|---|---|
| G06K 9/46 | (2006.01) |
| G06N 20/10 | (2019.01) |
| G06K 9/42 | (2006.01) |
| G06K 9/62 | (2006.01) |
| G06N 3/08 | (2006.01) |
| G06N 7/00 | (2006.01) |

(52) U.S. Cl.
CPC ............. *G06K 9/4638* (2013.01); *G06K 9/42* (2013.01); *G06K 9/6277* (2013.01); *G06N 3/08* (2013.01); *G06N 7/005* (2013.01); *G06N 20/10* (2019.01)

(58) Field of Classification Search
CPC .... G06N 3/0472; G06N 3/0454; G06N 3/084; G06N 3/08–088; G06N 20/00–10; G06N 7/005; G06T 2207/10032; G06T 2207/20076; G06T 2207/0081; G06T 2207/0084; G06T 7/73; G06T 7/11; G06K 9/00637; G06K 9/46–469; G06K 9/4638; G06K 9/42; G06K 9/4628; G06K 9/6267; G06K 9/6268; G06K 9/6277; G06K 9/6256
See application file for complete search history.

(56) References Cited

PUBLICATIONS

X. Wei, Y. Guo, X. Gao, M. Yan and X. Sun, "A new semantic segmentation model for remote sensing images," 2017 IEEE International Geoscience and Remote Sensing Symposium (IGARSS), Fort Worth, TX, 2017, pp. 1776-1779, doi: 10.1109/IGARSS.2017.8127319. (Year: 2017).*

* cited by examiner

*Primary Examiner* — Vu Le
*Assistant Examiner* — Julius Chenjun Chai
(74) *Attorney, Agent, or Firm* — Matthias Scholl P.C.; Matthias Scholl (57) ABSTRACT

A method of extraction of an impervious surface of a remote sensing image. The method includes: 1) obtaining a remote sensing image of a target region, performing normalization for image data, and dividing the normalized target region image into a sample image and a test image; 2) extracting an image feature of each sample image by constructing a deep convolutional network for feature extraction of the remote sensing image; 3) performing pixel-by-pixel category prediction for each sample image respectively; 4) constructing a loss function by using an error between a prediction value and a true value of the sample image and performing update training for network parameters of the deep convolutional network and network parameters relating to the category prediction; and 5) extracting an image feature from the test image through the deep convolutional network based on the training result obtained in 4).

3 Claims, 11 Drawing Sheets

METHOD AND SYSTEM OF EXTRACTION OF IMPERVIOUS SURFACE OF REMOTE SENSING IMAGE

CROSS-REFERENCE TO RELATED APPLICATIONS

Pursuant to 35 U.S.C. § 119 and the Paris Convention Treaty, this application claims foreign priority to Chinese Patent Application No. 201810809896.6 filed Jul. 23, 2018, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to the field of information extraction of remote sensing image data, and more particularly to a method and system of extraction of an impervious surface of a high-resolution remote sensing image based on joint deep learning and semantic probability.

An impervious surface refers to an artificial ground surface that prevents water moisture from penetrating into soil, such as buildings, roads, plazas, parking lots, and the like, and is one of key indicators for evaluating health of urban ecosystems and quality of human settlements.

Deep learning, especially a convolutional neural network, performs feature extraction and recognition from a low level to a high level for an external input signal by simulating a cognitive process of a human brain, and achieves a series of breakthrough application results in the fields of classification, segmentation and content understanding of natural images. However, the convolutional neural network cannot effectively establish a spatial relationship between different terrains for remote sensing images with lower spatial resolutions and more complex terrain types, thus leading to fragmentation or irrationality of classification results.

SUMMARY

To accurately mine features from remote sensing images and apply the features to impervious surface extraction, the disclosure provides a method and system of extraction of an impervious surface of a high-resolution remote sensing image based on joint deep learning and semantic probability.

The disclosure provides a method of extraction of an impervious surface of a remote sensing image, the method comprising:
1) obtaining a high-resolution remote sensing image of a target region, performing normalization for image data, and dividing the normalized target region image into a sample image and a test image;
2) extracting an image feature of each sample image by constructing a deep convolutional network for feature extraction of the high-resolution remote sensing image, wherein the deep convolutional network is formed by a plurality of convolution layers, pooling layers and corresponding unpooling layers and deconvolution layers;
3) performing pixel-by-pixel category prediction for each sample image respectively by using the image feature obtained by extraction;
4) constructing a loss function by using an error between a prediction value and a true value of the sample image and performing update training for network parameters of the deep convolutional network and network parameters relating to the category prediction; and
5) extracting an image feature from the test image through the deep convolutional network based on a training result obtained in 4), performing the pixel-by-pixel category prediction by using the image feature obtained by extraction, and then, constructing a conditional random field model of the image by using semantic association information between pixel points, performing global optimization for a prediction result of the test image, obtaining a classification result, and realizing impervious surface extraction.

By performing the image data normalization in 1), the target region image is allowed to have a smooth nature and an adverse effect of singularity data on model learning is eliminated.

A front-half segment of the deep convolutional network is formed by crosswise stacking a plurality of convolution layers and pooling layers to realize multi-scale feature extraction of the remote sensing image in this process, and a rear-half segment is formed by stacking corresponding unpooling layer and deconvolution layers to re-map the feature extracted by the front half segment of the network to each pixel point so that pixel-by-pixel feature extraction and category probability prediction are finally realized to obtain the image feature of each target region image.

Performing the pixel-by-pixel category prediction by using the image feature obtained by extraction is implemented in the following manner: obtaining a probability that each pixel point corresponds to each terrain category by predicting a probability that each pixel point belongs to each category based on Softmax Regression.

In 4), when update training is performed for the network parameters of the deep convolutional network and the network parameters relating to the category prediction, iterative update is performed by a gradient descent method until the loss function is reduced to satisfy a preset condition.

An energy function of the conditional random field model is formed by combining a data item with a smooth item, the data item penalizes inconsistency between a prediction category label and a real category label, the smooth item penalizes inconsistency of adjacent pixel category labels, and the accurate impervious surface extraction is finally realized by balancing a relationship of the two items.

Assuming that $x_i$ refers to a label variable of the i-th pixel and is a 0-1 vector, when a pixel corresponding to $x_i$ belongs to the k-th terrain category, the k-th element $x_{i,k}$ of $x_i$ is 1, others are 0, $x=\{x_i\}_{i=1}^{N}$ is a label variable set, and the conditional random field model is expressed as an energy function $E(x)$ as follows:

$$E(x)=\Sigma_i \Psi_u(x_i)+\Sigma_{(i,j)\star E}\Psi_p(x_i,x_j),$$

wherein, $(i,j) \in E$ refers to that the i-th pixel and the j-th pixel are adjacent vertexes, and
the data item $\Psi_u(x_i)$ constrains a distance between a label and a prediction probability $\hat{p}_{i,k}$;

$$\Psi_u(x_i)=\Sigma_{i,j}\Sigma_k x_{i,k} \ln \hat{p}_{i,k},$$

wherein the prediction probability $\hat{p}_{i,k}$ refers to a probability that the i-th pixel belongs to the k-th category, which is obtained by prediction; and
the smooth item $\Psi_p(x_i,x_j)$ penalizes the inconsistency of labels between adjacent pixels;

$$\Psi_p(x_i,x_j)=\mu(x_i,x_j)(k^{(1)}(I_i,I_j)+\lambda k^{(2)}(I_i,I_j))$$

wherein $$\mu(x_i, x_j) = \begin{cases} 1, & x_i = x_j \\ 0, & \text{else} \end{cases}$$

refers to an indicative function of the label variables $x_i$ and $x_1$, $k^{(1)}$ $(I_i, I_j)$ and $k^{(2)}$ $(I_i, I_j)$ require the labels of spatially adjacent pixels to be consistent and adjacent pixel categories with consistent spectrums to be consistent respectively, $I_i$ refers to a spectrum feature of the i-th pixel point, $I_j$ refers to a spectrum feature of the j-th pixel point, and $\lambda$ is a controllable parameter.

Also provided is an impervious surface extraction system of a high-resolution remote sensing image based on joint deep learning and semantic probability, the system comprising:

a first module, configured to obtain a high-resolution remote sensing image of a target region, perform normalization for image data, and divide the normalized target region image obtained into two parts, i.e., a sample image and a test image;

a second module, configured to extract an image feature of each sample image by constructing a deep convolutional network for feature extraction of the high-resolution remote sensing image, wherein the deep convolutional network is formed by a plurality of convolution layers, pooling layers and corresponding unpooling layers and deconvolution layers;

a third module, configured to perform pixel-by-pixel category prediction for each sample image respectively by using the image feature obtained by extraction;

a fourth module, configured to construct a loss function by using an error between a prediction value and a true value of the sample image and perform update training for network parameters of the deep convolutional network and network parameters relating to the category prediction; and a fifth module, configured to extract an image feature from the test image through the deep convolutional network based on a training result of the fourth module, perform the pixel-by-pixel category prediction by using the image feature obtained by extraction, and then, construct a conditional random field model of the image by using semantic association information between pixel points, perform global optimization for a prediction result of the test image, obtain a classification result, and realize impervious surface extraction.

A front-half segment of the deep convolutional network is formed by crosswise stacking a plurality of convolution layers and pooling layers to realize multi-scale feature extraction of the remote sensing image in this process, and a rear-half segment is formed by stacking corresponding unpooling layers and deconvolution layers to re-map the feature extracted by the front-half segment of the deep convolutional network to each pixel point so that pixel-by-pixel feature extraction and category probability prediction are finally realized to obtain the image feature of each target region image.

An energy function of the conditional random field model is formed by combining a data item with a smooth item, the data item penalizes inconsistency between a prediction category label and a real category label, the smooth item penalizes inconsistency of adjacent pixel category labels, and the accurate impervious surface extraction is finally realized by balancing a relationship of the two items.

The disclosure provides a method of impervious surface remote sensing extraction in which automatic feature extraction is performed by constructing a deep convolutional network for a high-resolution remote sensing image, and semantic optimization is performed for a prediction result by innovatively combining the extracted feature with a probability model, thereby obtaining a more reasonable impervious surface extraction result. According to the disclosure, accurate impervious surface extraction is performed for a remote sensing image by performing the automatic feature extraction based on data and associating the extracted feature with a neighborhood semantic relationship of pixel points, a data source is easy to obtain and operation procedures are definite and repeatable.

BRIEF DESCRIPTION OF THE DRAWINGS

FIG. 4A-4D illustrates experimental results of impervious surface extraction on the third image in FIG. 3 with different methods, where FIG. 4A is an original image, FIG. 4B show results of deep learning method, FIG. 4C show results of RF, and FIG. 4D show results of SVM; and FIG. 5A-5D illustrates experimental results of impervious surface extraction on the fourth image in FIG. 3 with different methods, where FIG. 5A is an original image, FIG. 5B show results of deep learning method, FIG. 5C show results of RF, and FIG. 5D show results of SVM.

DETAILED DESCRIPTION

To further illustrate, embodiments detailing a method and system of extraction of an impervious surface of a high-resolution remote sensing image are described below. It should be noted that the following embodiments are intended to describe and not to limit the disclosure.

To solve the defects in the prior art, it is proposed that a deep learning model is trained to perform accurate impervious surface extraction by using entire image as an input and introducing global optimization and category spatial relationship information as a constraint based on a deep convolutional network in the disclosure.

Figure 1:
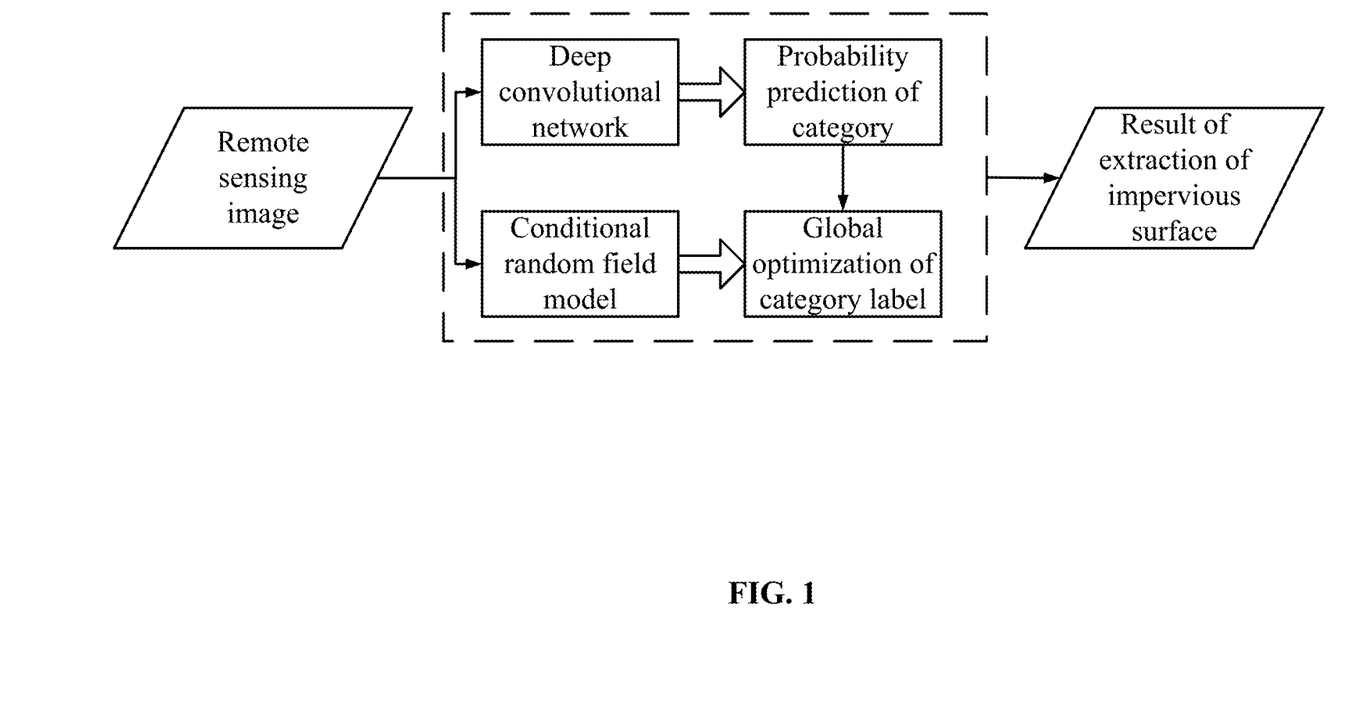
FIG. 1 is a flowchart illustrating a method according to an example of the disclosure.

As shown in FIG. 1, an impervious surface extraction method of a high-resolution remote sensing image based on joint deep learning and semantic probability provided by an example of the disclosure includes the following blocks.

At block 1, a high-resolution remote sensing image of a target region is obtained, image data normalization is performed, and a normalized target region image is divided into two parts, i.e. a sample image and a test image.

The purpose of the pre-processing of the image normalization is to allow an image to have a smooth nature and eliminate an adverse impact of singularity data on model learning.

A high-resolution remote sensing image generally refers to a remote sensing image with a resolution being at a meter or sub-meter level, that is, with a spatial resolution being within 10 m. In a specific implementation, the persons skilled in the art may preset a target region and obtain a plurality of high-resolution remote sensing images of the target region. For example, Gaofen-2 satellite is applied in an example. A normalization method used in the example is feature standardization. The purpose of the feature standardization is to allow all features in image data to have zero mean values and unit variances, that is, each dimension of data has the zero mean value and the unit variance, and the image data is normalized to allow an image to have a smooth nature. The feature standardization specifically includes: first, calculating a mean value of data on each waveband (calculating with all images); then, subtracting the mean value from each waveband; and then dividing each waveband of the image by a standard deviation of the waveband.

At block 2, an image feature of each sample image is extracted by constructing a deep convolutional network for feature extraction of a high-resolution remote sensing image with modules of a plurality of convolution layers and pooling layers and corresponding unpooling layers and deconvolution layers.

The image feature of each sample image is extracted by processing the sample image in the target region image normalized at block 1.

A front-half segment of the deep convolutional network constructed at block 2 is formed by crosswise stacking a plurality of convolution and pooling layers to realize multi-scale feature extraction of the remote sensing image in this process, and a rear-half segment is formed by stacking the corresponding unpooling and deconvolution layers to re-map the feature extracted by the front-half segment to each pixel point, thereby finally realizing pixel-by-pixel feature extraction.

In a specific implementation, the adopted deep convolutional network F includes 2L+M network layers, where the first L layers refer to convolution+pooling layers, intermediate M layers refer to atrous convolution layers, and the last L layers refer to unpooling+deconvolution layers, as shown in Table 1. Firstly, the multi-scale feature of the image is obtained by passing the remote sensing image I through the first L layers.

$$F_L = p(\delta(\ldots p(\delta((p(\delta(I*W_1+b_1)))*W_2+b_2))+b_L)) \quad (1)$$

In the above formula, * refers to a convolution operation, $p(\bullet)$ and $\delta(\bullet)$ refer to a pooling function and a non-linear activation function respectively, $W_l$ and $b_l$ refer to a convolution kernel and a bias term respectively, and $l=1, 2, \ldots, 2L+M$. In this process, although the multi-scale feature of the image is extracted by the network step by step, a resolution of a feature space is also reduced at the same time.

Next, a feature is obtained by further passing the feature $F_L$ through the M atrous convolution layers.

$$F_{L+M} = \delta(\ldots \delta((\delta(F_L \otimes_{s_{L+1}} W_{L+1}+b_{L+1})) \otimes_{s_{L-2}} W_{L+2}+b_{L+2}) \ldots +b_{L+M}) \quad (2)$$

In the above formula, $\otimes_{s_1}$ refers to an atrous convolution of a step length of $s_1$, and $l=L+1, L+2, \ldots, L+M$ herein. The purpose of using the atrous convolution is to further extract a multi-scale pyramid feature of the image without lowering the resolution of the feature space.

Finally, a feature corresponding to the image is output and obtained by passing the multi-scale feature $F_{L+M}$ obtained by extraction through the corresponding unpooling or deconvolution layers and mapping the multi-scale feature to a feature space with a size equal to that of an original input image.

$$F(I) = \delta(\ldots \breve{p}(\delta((\breve{p})(\delta(\breve{p}(I) \otimes W_{L+M+1}+b_{L+M+1}))) \otimes W_{L+M+2}+b_{L+M+2})) \ldots +b_{2L+M}) \quad (3)$$

In the above formula, $\breve{p}(\bullet)$ refers to an unpooling function corresponding to the pooling function $p(\bullet)$, and $\otimes$ refers to a deconvolution operation.

TABLE 1

Structural table of deep convolutional network for impervious surface extraction of high-resolution image

| | Layer No. | | | | | |
|---|---|---|---|---|---|---|
| | 1 | ... L | L + 1 | ... L + M | L + M + 1 | ... 2L + M |
| Operation | Convolution + Pooling | ... Convolution + Pooling | Atrous convolution | ... Atrous convolution | Unpooling + Deconvolution | ... Unpooling + Deconvolution |

At block 3, pixel-by-pixel category prediction is performed for the sample image by using the image feature obtained by extraction at block 2.

In a specific implementation of the disclosure, after the pixel-by-pixel feature F (I) of the image is extracted, a probability that each pixel point corresponds to each terrain category is obtained by predicting the probability that each pixel belongs to each category based on Softmax Regression.

$$\hat{p}_{i,k} = \frac{e^{\tilde{W}_k^T F_i(I)}}{e^{\tilde{W}_1^T F_i(I)} + e^{\tilde{W}_2^T F_i(I)} + e^{\tilde{W}_3^T F_i(I)}}, k = 1, 2, 3, i = 1, 2, \ldots, N \quad (4)$$

In the above formula, $\hat{p}_{i,k}$ refers to a probability that the i-th pixel belongs to the k-th category, which is obtained through prediction, where k corresponds to an impervious surface, a pervious surface and a water body on the remote sensing image respectively when k is 1, 2 and 3; $F_i(I)$ refers to a feature that belongs to the i-th pixel point on the image I and is obtained by extraction, N refers to a total number of pixel points on the image I, and $\tilde{W}_k(k=1,2,3)$ refers to a trainable network parameter; e refers to a base of a natural logarithm, and T refers to transposition of a matrix; $\hat{p}_i = [\hat{p}_{i,1}, \hat{p}_{i,3}, \hat{p}_{i,3}]$ refers to a category probability of the i-th pixel point obtained by prediction.

At block 4, a loss function is constructed by using an error between a prediction value and a true value of the sample image, and update training is performed for network parameters of the deep convolutional network and network parameters relating to the category prediction, that is, the parameters at block 2 and block 3 are determined by training.

The loss function described at block 4 is required to accurately describe the error between the prediction result and the true value of the sample, and then, parameters to be trained are learned and updated by a gradient descent method. The parameters to be trained include network parameters $W_1, W_2, \ldots W_{2L+M}, b_1, b_2, \ldots, b_{2L+m}$ of the deep convolutional network and the network parameters $\tilde{W}_1, \tilde{W}_2, \tilde{W}_3$ relating to the category prediction.

In a specific implementation, a category true value corresponding to an image is denoted as $y = \{y_i\}_{i=1}^N$, refers to a 0-1 vector of a category label ($y_i$ is the 0-1 vector; when a pixel corresponding to $y_i$ belongs to the k-th (k=1,2,3) terrain category, the k-th element of $y_i$ (i.e., $y_{i,k}$) is equal to 1, and others are 0, and a loss function may be constructed by cross entropy as follows:

$$\text{Loss} = -\frac{1}{N}\sum_i \sum_k y_{i,k} \ln \hat{p}_{i,k} \tag{5}$$

Then, a partial derivative of each parameter in a parameter set $0=\{W_1, W_2, \ldots, W_{2L+m}, \tilde{W}_1, \tilde{W}_2, \tilde{W}_3, b_1, b_2, \ldots, b_{2L+M}\}$ with respect to the loss function Loss is obtained, and iterative update is performed for each training parameter by the gradient descent method. In a specific implementation, an iterative initial value of the parameter may be randomly generated by a computer, until the loss function Loss is reduced to satisfy a preset condition, for example, to satisfy a preset threshold range or tend to be stable. After the training is completed, block 5 is performed.

At block 5, an image feature is extracted from the test image through the deep convolutional network by using the model parameters (i.e., the network parameters of the deep convolutional network and the network parameters relating to the category prediction) trained at block 4, the pixel-by-pixel category prediction is performed by using the image feature obtained by extraction (in a manner consistent with those of block 2 and block 3), and then, a classification result is obtained by constructing a conditional random field model of the image based on semantic association information between pixel points and performing global optimization for a prediction result.

In an example, an energy function of the conditional random field model is formed by combining a data item with a smooth item, the data item penalizes inconsistency between a prediction category label and a real category label, the smooth item penalizes inconsistency between adjacent pixel category labels, and the accurate extraction of the impervious surface is finally realized by balancing a relationship of the two items.

Figure 2:
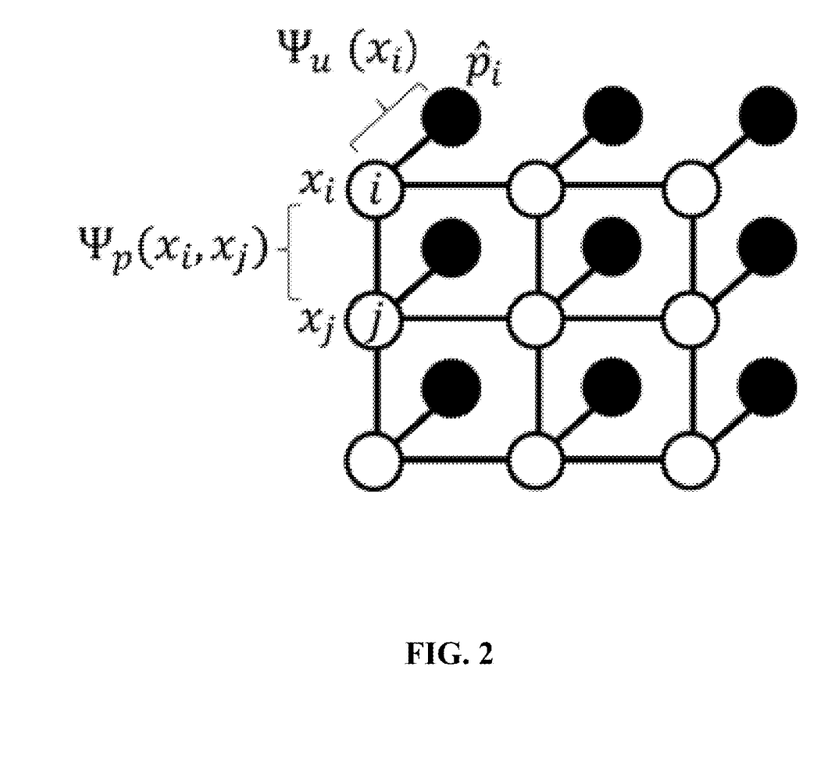
FIG. 2 illustrates a conditional random field probability model according to an example of the disclosure.

In a specific implementation, the image is constructed into a graph G(V,E) according to an adjacency relationship, where $v \in V$ and $e \in E$ refer to a vertex and an edge of the graph G, V is a vertex set, v refers to a vertex in the vertex set, E is an edge set, and e refers to an edge in the edge set. Each vertex corresponds to one pixel on the image, and two adjacent vertexes i,j are connected by the edge $e_{i,j}$, as shown in FIG. 2. The vertexes i, j correspond to the i-th pixel and the j-th pixel respectively.

It is assumed that $x_i$ refers to a label variable of the i-th pixel ($x_i$ is the 0-1 vector; when a pixel corresponding to $x_i$ belongs to the k-th (k=1,2,3) terrain category, the k-th element of $x_i$ is 1, and others are 0). Similarly, when $x_1$ refers to a label variable of the j-th pixel, $x=\{x_i\}_{i=1}^N$ is a label variable set. In the disclosure, a corresponding conditional random field model may be constructed and expressed as an energy function E(x) as follows:

$$E(x)=\Sigma_i \Psi_u(x_i)+\Sigma_{(i,j)\in E}\Psi_p(x_i,x_j) \tag{6}$$

In the above formula, $(i,j) \in E$ refers to that the vertexes i,j are adjacent, that is, the i-th pixel and the j-th pixel are adjacent vertexes.

Herein, the data item $$\Psi_u(x_i)=\Sigma_{i,j}\Sigma_k x_{i,k} \ln \hat{p}_{i,k} \tag{7}$$

constrains a distance between a label and a prediction probability $\hat{p}_{i,k}$.

Herein, the smooth item $$\Psi_p(x_i, x_j) = \mu(x_i, x_j)(k^{(1)}(I_i, I_j) + \lambda k^{(2)}(I_i,I_j)) = \mu(x_i, x_j)\left(\exp\left(-\frac{d^2(i,j)}{2\theta_\alpha^2}\right) + \lambda \exp\left(-\frac{d^2(i,j)}{2\theta_\beta^2} - \frac{|I_i - I_j|^2}{2\theta_\gamma^2}\right)\right) \tag{8}$$

penalizes inconsistency of labels between adjacent pixels, where $$\mu(x_i, x_j) = \begin{cases} 1, & x_i = x_j \\ 0, & \text{else} \end{cases}$$

refers to an indicative function of the label variables $x_i$ and $x_j$. In combination with an actual application of impervious surface extraction of a high-resolution image, the following two kernel functions are mainly considered in the disclosure.

$$k^{(1)}(I_i, I_j) = \exp\left(-\frac{d^2(i,j)}{2\theta_\alpha^2}\right) \tag{9}$$

$$k^{(2)}(I_i, I_j) = \exp\left(-\frac{d^2(i,j)}{2\theta_\beta^2} - \frac{|I_i - I_j|^2}{2\theta_\gamma^2}\right) \tag{10}$$

The inconsistency of labels between adjacent pixels is penalized, where $k^{(1)}(I_i,I_j)$ and $k^{(2)}(I_i,I_j)$ require the labels of spatially adjacent pixels to be consistent and adjacent pixel categories with consistent spectrums to be consistent respectively. $I_i$ refers to a spectrum feature of the i-th pixel point, $I_j$ refers to a spectrum feature of the j-th pixel point, $d^2(i,j)$ refers to a square of a spatial distance between the i-th pixel point and the j-th pixel point, and $\lambda$, $\theta_\alpha$, $\theta_\beta$ and $\theta_\gamma$ are controllable parameters that can be preset according to an image situation in a specific implementation. In a practical application, it is suggested that default parameters $\lambda=1$, $\theta_\alpha=2$, $\theta_\beta=2$ and $\theta_\gamma=1$ are applied to a remote sensing image with a spatial resolution of 2 meters, where the parameters $\theta_\alpha$, $\theta_\beta$ and $\theta_\gamma$ may be properly decreased with the increase of the spatial resolution of the processed image. Finally, a combination of label variables minimizing the energy functions E(x) is selected as a final terrain category corresponding to each pixel point.

In the disclosure, the deep convolutional network and a probability graph model may be considered to form one end-to-end impervious surface extraction model, where the input is an entire remote sensing image, and the output divides the remote sensing image into three parts, i.e., an impervious surface (such as a house and a road), a pervious surface (such as bare soil and vegetation) and a water body. In a specific implementation, the feature extraction and the category prediction may be performed for other images to be extracted by using the trained deep convolutional network; then, global optimization is performed for a prediction result in combination with the conditional random field model; finally, the extraction of the impervious surface is realized, and the remote sensing image is divided into three parts, i.e. an impervious surface (such as a house and a road), a pervious surface (such as bare soil and vegetation) and a water body.

Figure 3:
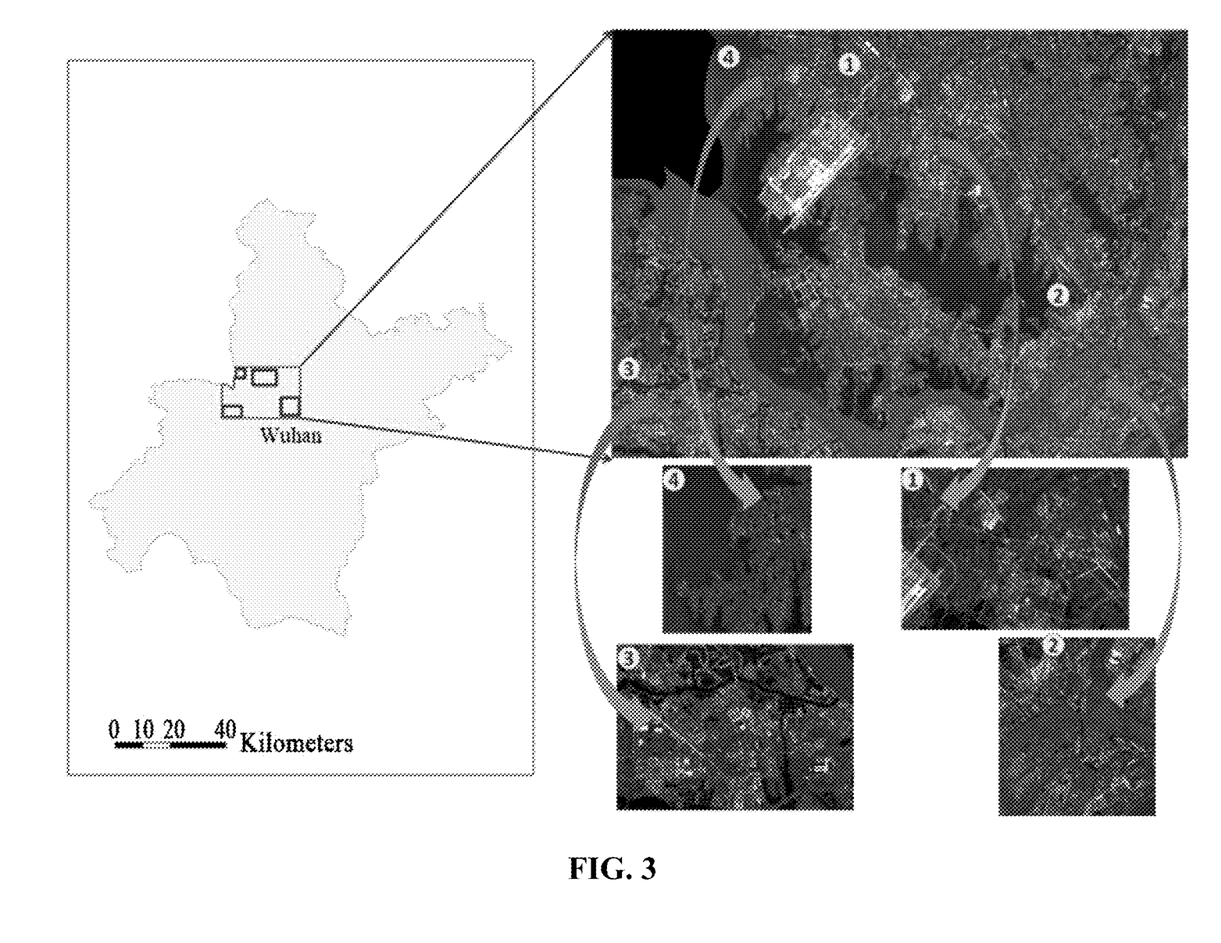
FIG. 3 illustrates an experimental area for impervious surface extraction.
Figure 4A:
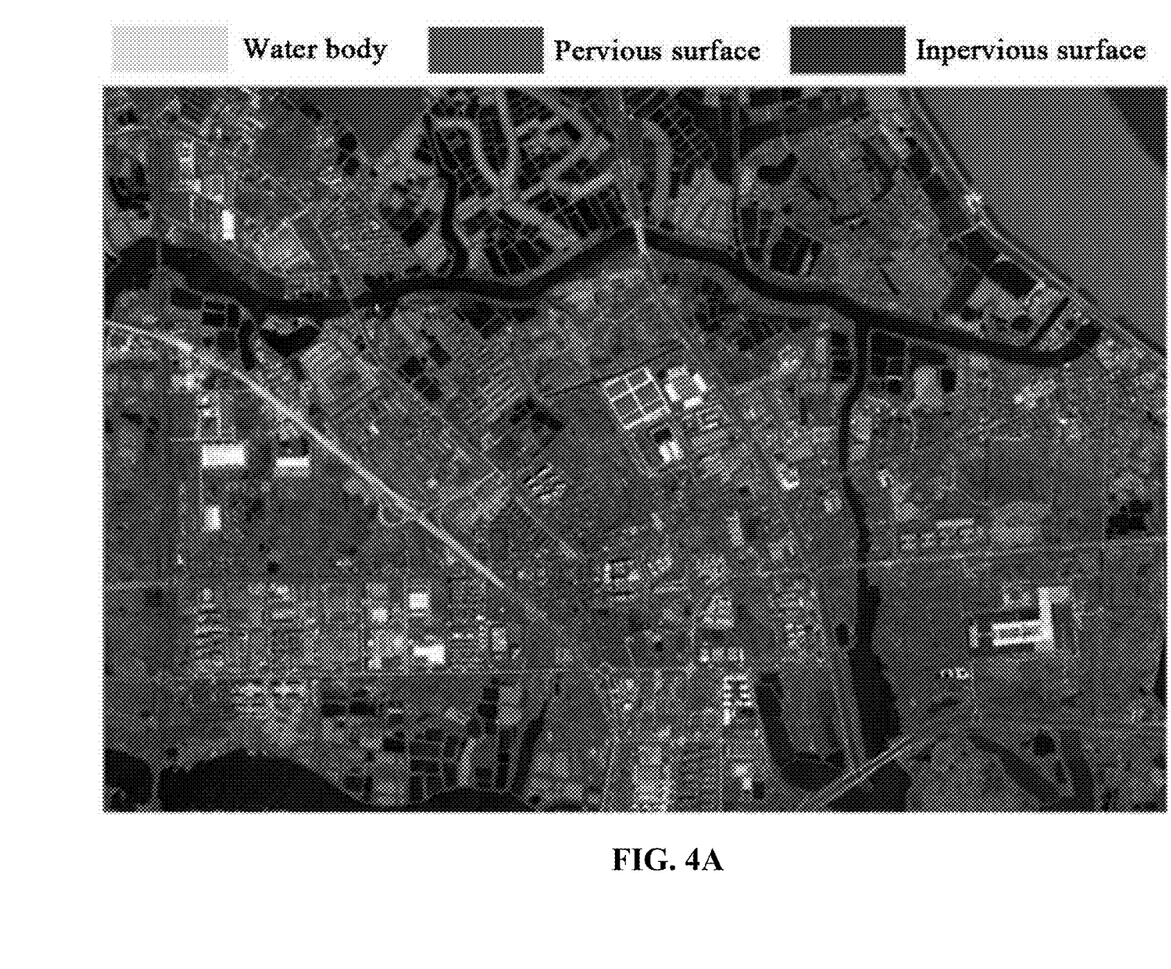
Figure 4B:
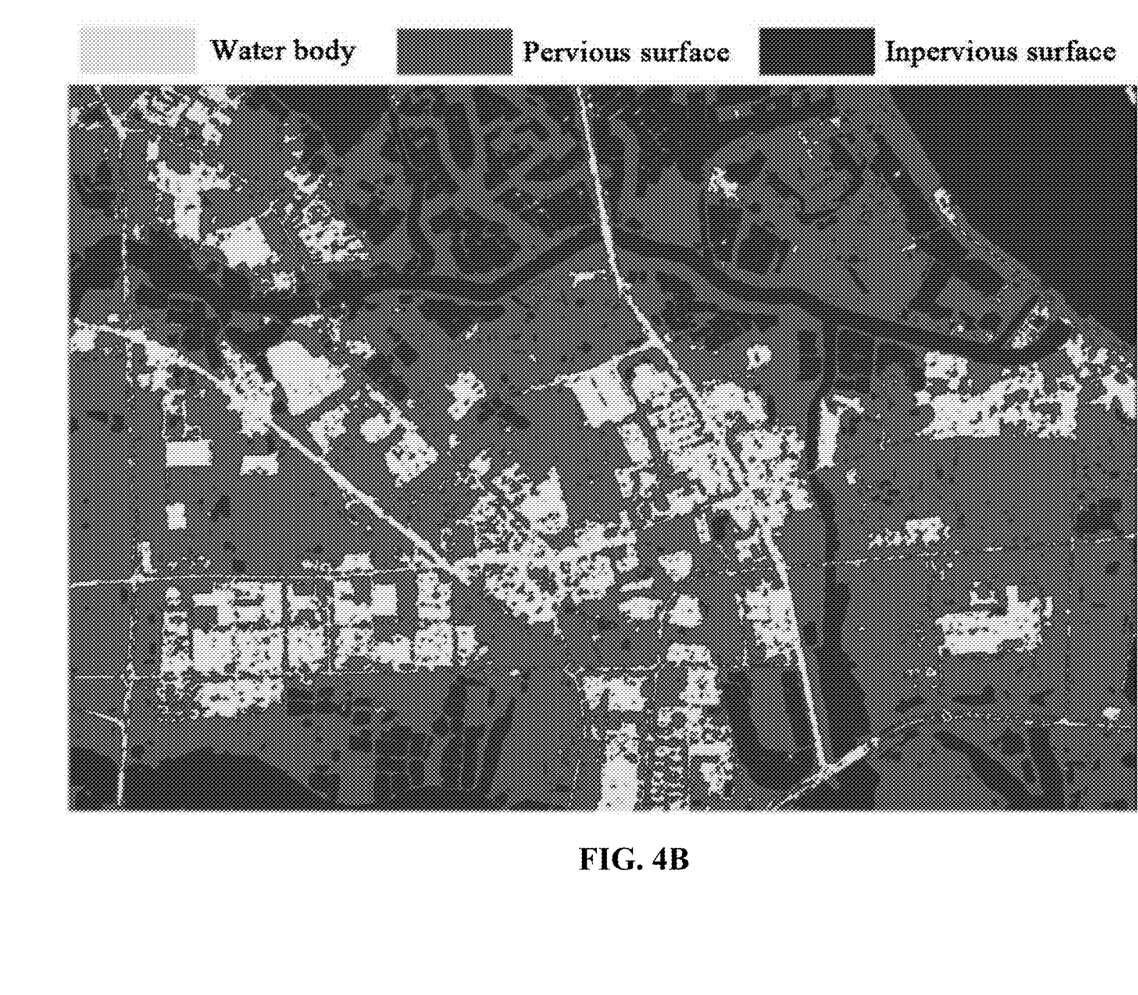
Figure 4C:
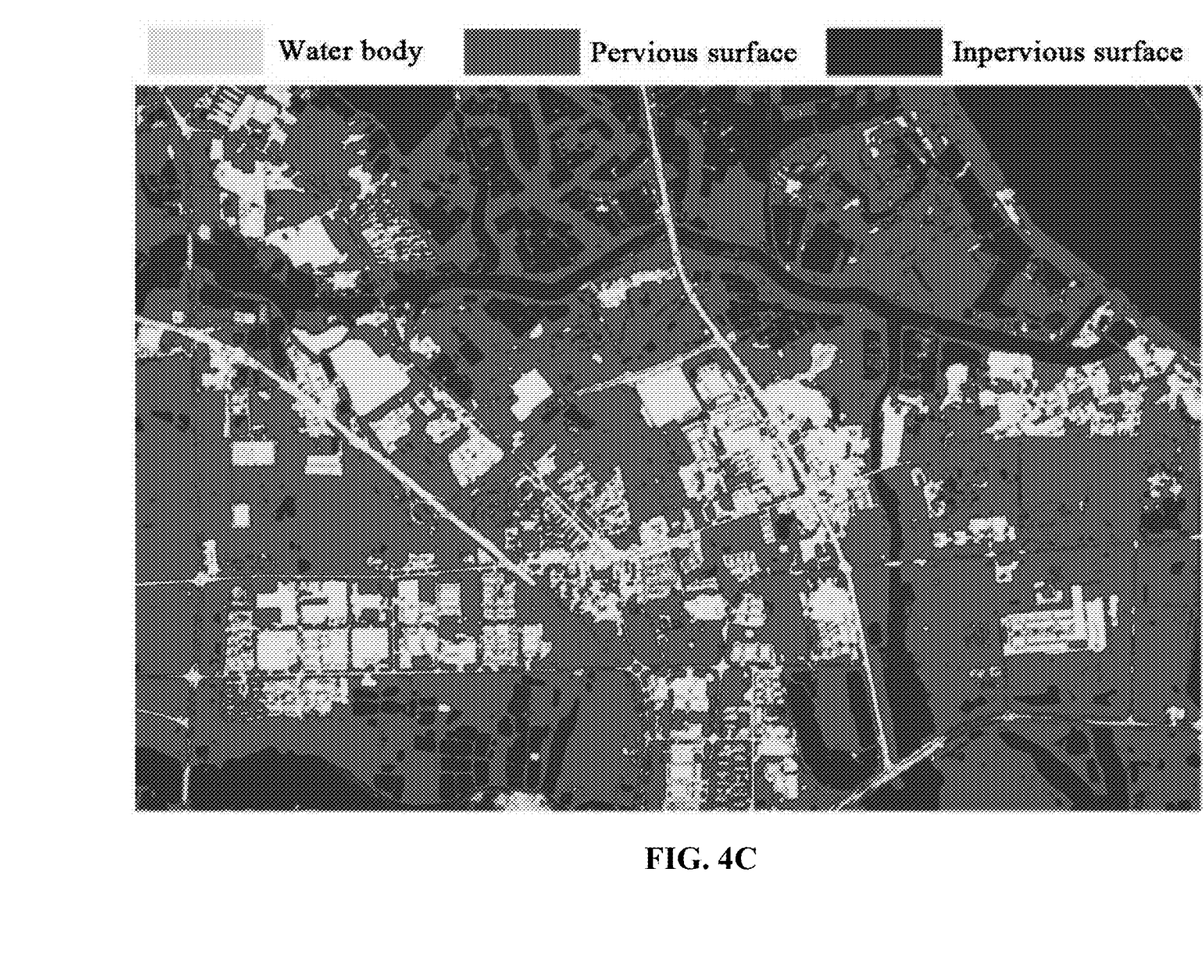
Figure 4D:
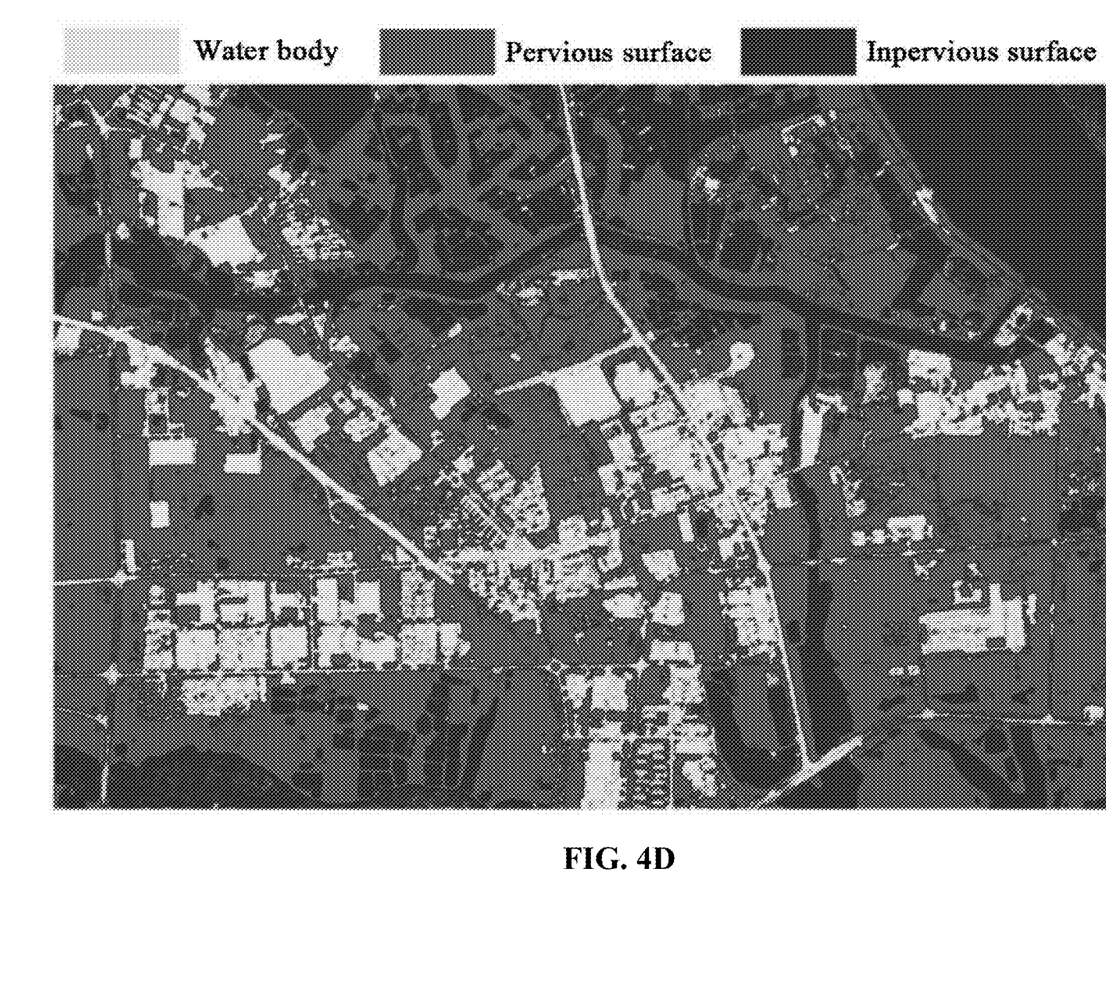
Figure 5A:
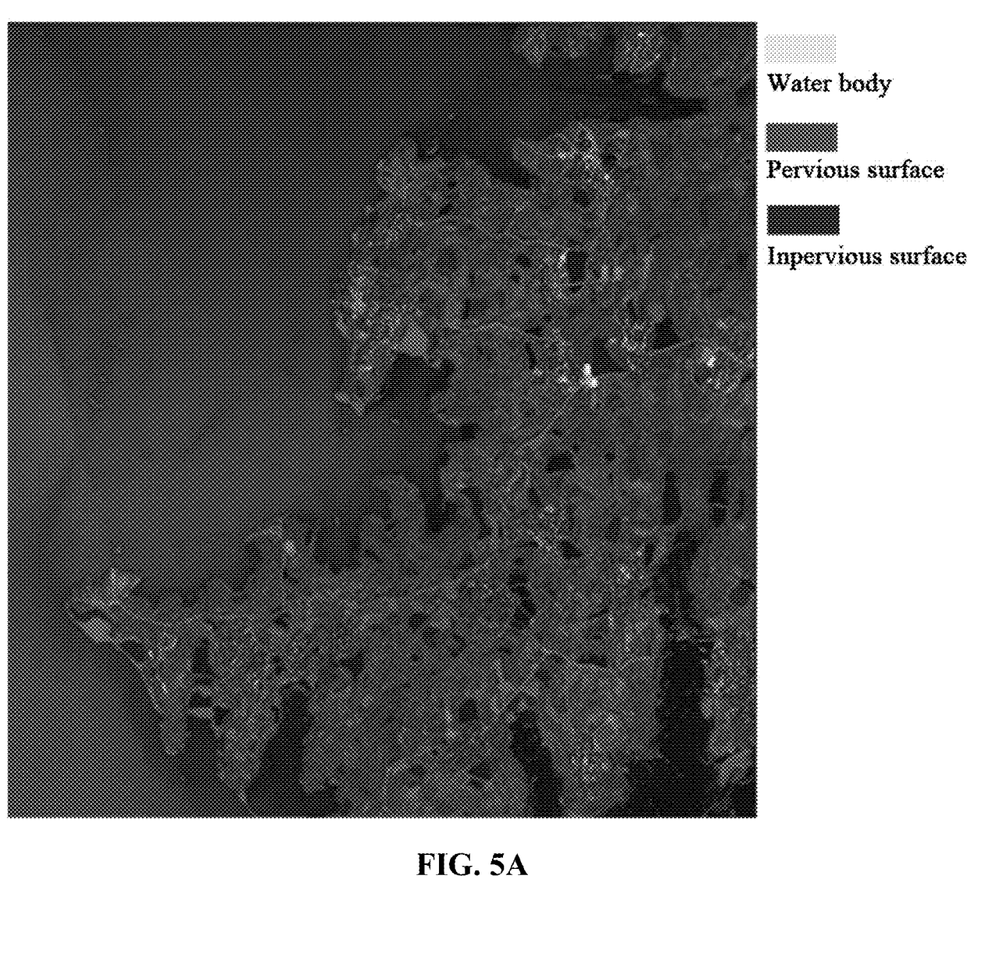
Figure 5B:
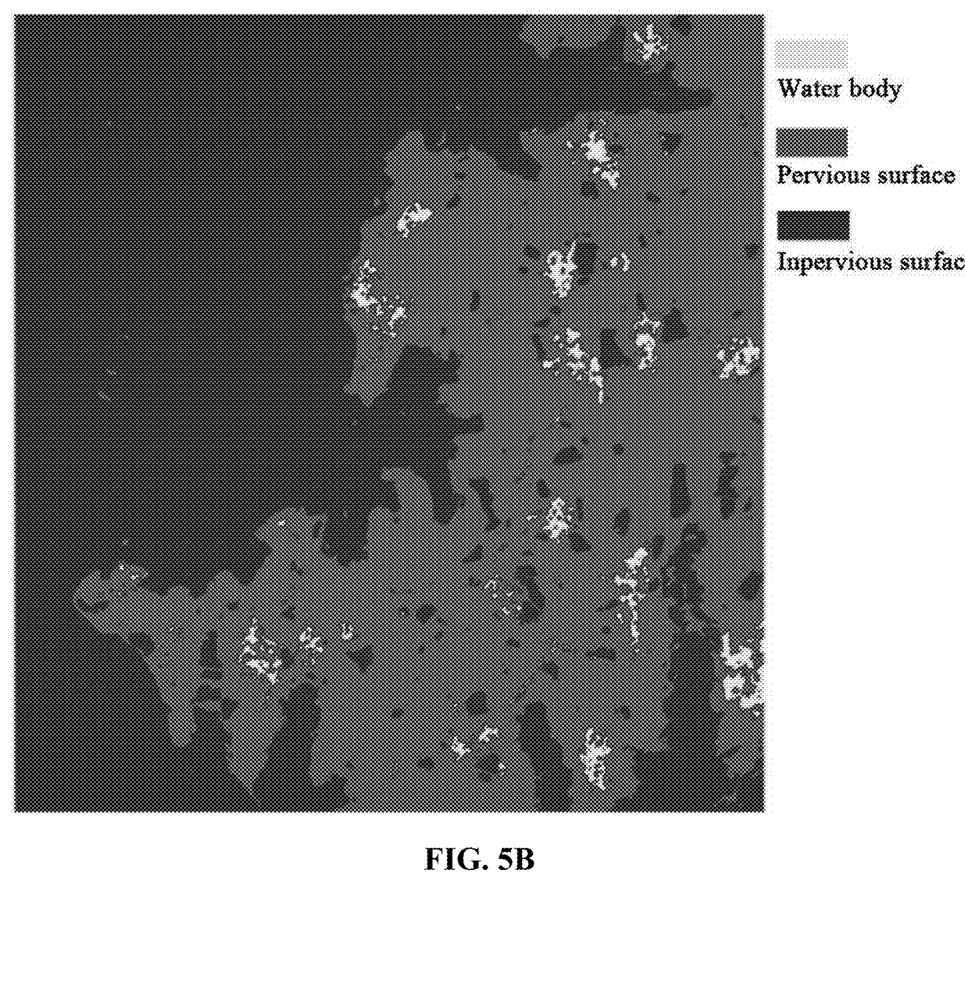
Figure 5C:
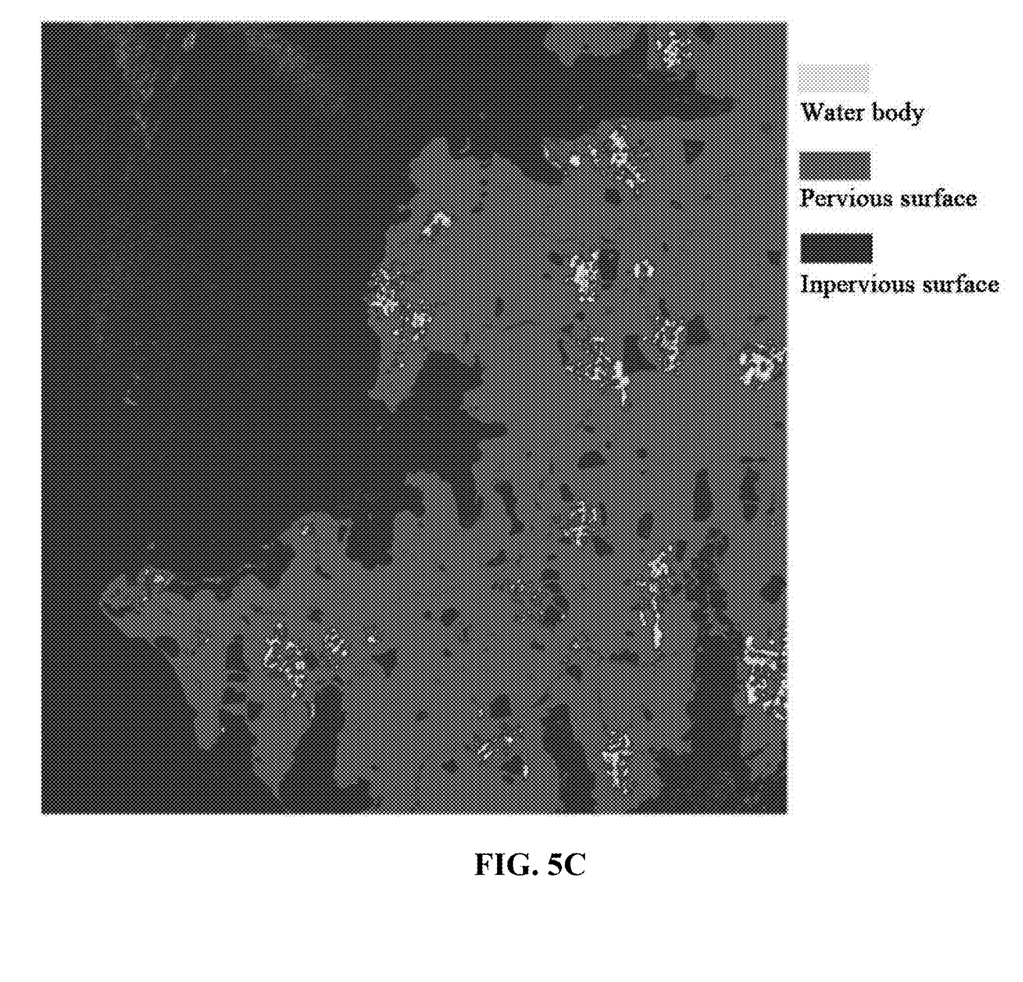
Figure 5D:
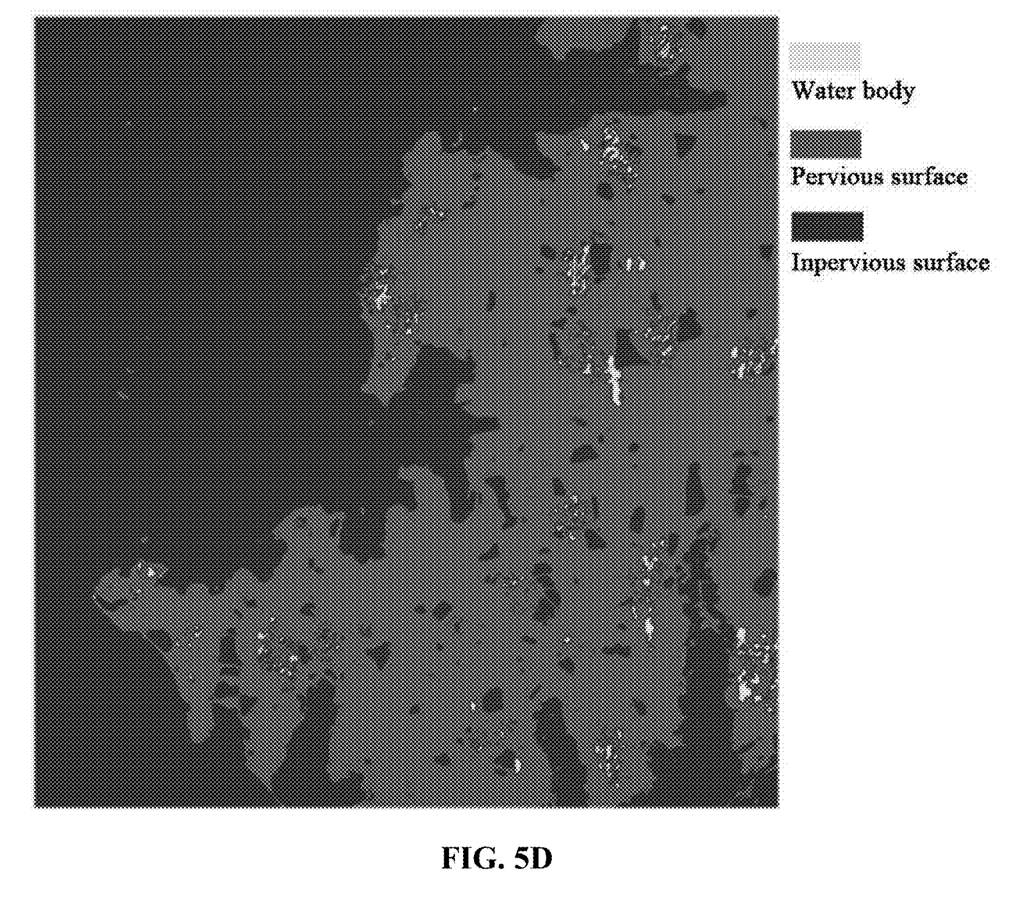

In an example, an impervious surface extraction experiment is performed by selecting four Gaofen-2 remote sensing images with a resolution of 2 meters from Huangpi District and Dongxihu District of Wuhan City as experimental data. The size of the first image is 3750×2610, the size of the second image is 2821×3127, the size of the third image is 2939×1999, and the size of the fourth image is 1406×1539. The images include several types of complex terrains such as vegetation, bare soil, a road, a building and a water body, and a ground true value divides the image into three categories, i.e. an impervious surface (such as a road and a building), a pervious surface (such as bare soil and vegetation) and a water body. The first and second images are used as training samples for model training, and the third and fourth images are used for testing. Notably, the third image contains the building compact districts, which is more difficult for impervious surface extraction.

For comparison, two other commonly used classification methods, i.e., random forest (RF) and support vector machine (SVM), were used for qualitative and quantitative experimental evaluation. Experimental results on the third and fourth images are provided in FIGS. 4A-4D and FIGS. 5A-5D respectively. Experimental results show that, the deep learning-based method shows better impervious surface extraction performance, maintaining the structure of the ground objects. By comparison, RF and SVM are more sensitive to noise and miss the spatial relation among the adjacent pixels.

Furthermore, to quantitively access the experimental results, four common metrics, i.e., overall accuracy (OA), Kappa coefficient, user's accuracy and producer's accuracy were used. Specifically, the quantitive results on the third and fourth images are provided in Table 2 and Table 3. Results show that deep learning-based method is much robust than the comparison method, which further demonstrates the feasibility of using deep learning method for impervious surface extraction on remote sensing image.

TABLE 2

Quantitive results on the third image of the impervious surface

| | Metrics | | | |
|---|---|---|---|---|
| Methods | OA (%) | Kappa | User's accuracy (%) | Producer's accuracy (%) |
| Deep learning | 90.67 | 0.8403 | 79.0 | 84.8 |
| RF | 86.84 | 0.7761 | 76.3 | 75.0 |
| SVM | 87.34 | 0.7846 | 73.9 | 78.1 |

TABLE 3

Quantitive results on the fourth image of the impervious surface

| | Metrics | | | |
|---|---|---|---|---|
| Methods | OA (%) | Kappa | User's accuracy (%) | Producer's accuracy (%) |
| Deep learning | 96.87 | 0.9420 | 75.2 | 85.5 |
| RF | 94.11 | 0.8903 | 73.6 | 83.2 |
| SVM | 94.22 | 0.8905 | 73.7 | 83.8 |

In conclusion, the disclosure provides an impervious surface extraction method of a high-resolution remote sensing image based on joint deep learning and semantic probability in which the automatic feature extraction is performed for the high-resolution remote sensing image by constructing the deep convolutional network, and the semantic optimization is performed for the extracted feature by innovatively combining the extracted feature with the probability model, thereby obtaining a more reasonable impervious surface extraction result. According to the disclosure, the automatic feature extraction can be performed based on data, the extracted feature is associated with the neighborhood semantic relationship of pixel points, so that the impervious surface extraction is accurately performed for the remote sensing image. Further, the data source is easily obtained, the operation procedures are definite and repeatable, and therefore, the disclosure well complies with the actual urban planning application requirement.

In a specific implementation of the method, an automatic operation process may be performed based on a computer software technology, or a corresponding system may also be provided in a modular manner. An example of the disclosure also correspondingly provides an impervious surface extraction system of a high-resolution remote sensing image based on joint deep learning and semantic probability, including the following modules:

a first module, configured to obtain a high-resolution remote sensing image of a target region, perform normalization for image data, and divide the normalized target region image obtained into two parts, i.e. a sample image and a test image;

a second module, configured to extract an image feature of each sample image by constructing a deep convolutional network for feature extraction of the high-resolution remote sensing image, where the deep convolutional network is formed by a plurality of convolution layers and pooling layers and corresponding unpooling layers and deconvolution layers;

a third module, configured to perform pixel-by-pixel category prediction for each sample image respectively by using the image feature obtained by extraction;

a fourth module, configured to construct a loss function by using an error between a prediction value and a true value of the sample image and perform update training for network parameters of the deep convolutional network and network parameters relating to the category prediction; and a fifth module, configured to extract an image feature from the test image through the deep convolutional network based on a training result of the fourth module, perform the pixel-by-pixel category prediction by using the image feature obtained by extraction, and then, construct a conditional random field model of the image by using semantic association information between pixel points, perform global optimization for a prediction result of the test image, obtain a classification result and realize the impervious surface extraction.

A specific implementation of each module is referred to the corresponding blocks, which will not be described in detail herein.

It will be obvious to those skilled in the art that changes and modifications may be made, and therefore, the aim in the appended claims is to cover all such changes and modifications.

What is claimed is:
1. A method, comprising:
1) obtaining a remote sensing image of a target region, performing normalization for image data, and dividing the normalized target region image into a sample image and a test image;
2) extracting an image feature of each sample image by constructing a deep convolutional network for feature extraction of the remote sensing image, wherein the deep convolutional network is formed by a plurality of convolution layers, pooling layers and corresponding unpooling layers and deconvolution layers;

3) performing pixel-by-pixel category prediction for each sample image respectively by using the image feature obtained by extraction;
4) constructing a loss function by using an error between a prediction value and a true value of the sample image and performing update training for network parameters of the deep convolutional network and network parameters relating to the category prediction; and
5) extracting an image feature from the test image through the deep convolutional network based on a training result obtained in 4), performing the pixel-by-pixel category prediction by using the image feature obtained by extraction, and then, constructing a conditional random field model of the image by using semantic association information between pixel points, performing global optimization for a prediction result of the test image, obtaining a classification result, and realizing impervious surface extraction;

wherein:

an energy function of the conditional random field model comprises both a data item and a smooth item, the data item penalizes inconsistency between a prediction category label and a real category label, the smooth item penalizes inconsistency of adjacent pixel category labels, and the accurate impervious surface extraction is finally realized by balancing a relationship of the two items; and $x_i$ refers to a label variable of the i-th pixel and is a 0-1 vector, when a pixel corresponding to $x_i$ belongs to the k-th terrain category, the k-th element $x_{i,k}$ of $x_i$ is 1, others are 0, $x=\{x_i\}_{i=1}^{N}$ is a label variable set, and the conditional random field model is expressed as an energy function E(x) as follows:

$$E(x) = \sum_i \Psi_u(x_i) + \sum_{(i,j)\in E} \Psi_p(x_i, x_j)$$

wherein, $(i,j)\in E$ means that the i-th pixel and the j-th pixel are adjacent vertexes, and the data item $\Psi_u(x_i)$ constrains a distance between a label and a prediction probability $\hat{p}_{i,k}$;

$\Psi_u(x_i) = \Sigma_{i,j}\Sigma_k x_{i,k} \ln \hat{p}_{i,k}$, wherein the prediction probability $\hat{p}_{i,k}$ is a probability that the i-th pixel belongs to the k-th category, which is obtained by prediction; and the smooth item $\Psi_p(x_i,x_j)$ penalizes the inconsistency of labels between adjacent pixels by assigning this case a larger value;

$\Psi_p(x_i,x_j) = \mu(x_i,x_j)(k^{(1)}(I_i,I_j) + \lambda k^{(2)}(I_i,I_j))$ wherein $$\mu(x_i, x_j) = \begin{cases} 1, & x_i = x_j \\ 0, & else \end{cases}$$

refers to an indicative function of the label variables $x_i$ and $x_j$, $k^{(1)}(I_i,I_j)$ and $k^{(2)}(I_i,I_j)$ require the labels of spatially adjacent pixels to be consistent and adjacent pixel categories with consistent spectrums to be consistent respectively, $I_i$ refers to a spectrum feature of the i-th pixel point, $I_j$ refers to a spectrum feature of the j-th pixel point, and $\lambda$ is a controllable parameter.

2. A method, comprising:
1) obtaining a remote sensing image of a target region, performing normalization for image data, and dividing the normalized target region image into a sample image and a test image;
2) extracting an image feature of each sample image by constructing a deep convolutional network for feature extraction of the remote sensing image, wherein the deep convolutional network is formed by a plurality of convolution layers, pooling layers and corresponding unpooling layers and deconvolution layers;
3) performing pixel-by-pixel category prediction for each sample image respectively by using the image feature obtained by extraction;
4) constructing a loss function by using an error between a prediction value and a true value of the sample image and performing update training for network parameters of the deep convolutional network and network parameters relating to the category prediction; and
5) extracting an image feature from the test image through the deep convolutional network based on a training result obtained in 4), performing the pixel-by-pixel category prediction by using the image feature obtained by extraction, and then, constructing a conditional random field model of the image by using semantic association information between pixel points, performing global optimization for a prediction result of the test image, obtaining a classification result, and realizing impervious surface extraction;

wherein:

a front-half segment of the deep convolutional network is formed by crosswise stacking a plurality of convolution layers and pooling layers to realize multi-scale feature extraction of the remote sensing image in this process, and a rear-half segment is formed by stacking corresponding unpooling layer and deconvolution layers to re-map the feature extracted by the front half segment of the network to each pixel point so that pixel-by-pixel feature extraction and category probability prediction are finally realized to obtain the image feature of each target region image;

an energy function of the conditional random field model comprises both a data item and a smooth item, the data item penalizes inconsistency between a prediction category label and a real category label, the smooth item penalizes inconsistency of adjacent pixel category labels, and the accurate impervious surface extraction is finally realized by balancing a relationship of the two items; and $x_i$ refers to a label variable of the i-th pixel and is a 0-1 vector, when a pixel corresponding to $x_i$ belongs to the k-th terrain category, the k-th element $x_{i,k}$ of $x_i$ is 1, others are 0, $x=\{x_i\}_{i=1}^{N}$ is a label variable set, and the conditional random field model is expressed as an energy function E(x) as follows:

$$E(x) = \sum_i \Psi_u(x_i) + \sum_{(i,j)\in E} \Psi_p(x_i, x_j)$$

wherein, $(i,j)\in E$ refers to that the i-th pixel and the j-th pixel are adjacent vertexes, and the data item $\Psi(x_i)$ constrains a distance between a label and a prediction probability $\hat{p}_{i,k}$;

$\Psi_u(x_i) = \Sigma_{i,j}\Sigma_k x_{i,k} \ln \hat{p}_{i,k}$, wherein the prediction probability $\hat{p}_{i,k}$ is a probability that the i-th pixel belongs to the k-th category, which is obtained by prediction; and the smooth item $\Psi_p(x_i,x_j)$ penalizes the inconsistency of labels between adjacent pixels;

$$\Psi_p(x_i,x_j)=\mu(x_i,x_j)(k^{(1)}(I_i,I_j)+\lambda k^{(2)}(I_i,I_j))$$

wherein $$\mu(x_i, x_j) = \begin{cases} 1, & x_i = x_j \\ 0, & \text{else} \end{cases}$$

refers to an indicative function of the label variables $x_i$ and $x_j$, $k^{(1)}(I_i,I_j)$ and $k^{(2)}(I_i,I_j)$ require the labels of spatially adjacent pixels to be consistent and adjacent pixel categories with consistent spectrums to be consistent respectively, $I_i$ refers to a spectrum feature of the i-th pixel point, $I_j$ refers to a spectrum feature of the j-th pixel point, and $\lambda$ is a controllable parameter.

3. A method, comprising:

1) obtaining a remote sensing image of a target region, performing normalization for image data, and dividing the normalized target region image into a sample image and a test image;

2) extracting an image feature of each sample image by constructing a deep convolutional network for feature extraction of the remote sensing image, wherein the deep convolutional network is formed by a plurality of convolution layers, pooling layers and corresponding unpooling layers and deconvolution layers;

3) performing pixel-by-pixel category prediction for each sample image respectively by using the image feature obtained by extraction;

4) constructing a loss function by using an error between a prediction value and a true value of the sample image and performing update training for network parameters of the deep convolutional network and network parameters relating to the category prediction; and 5) extracting an image feature from the test image through the deep convolutional network based on a training result obtained in 4), performing the pixel-by-pixel category prediction by using the image feature obtained by extraction, and then, constructing a conditional random field model of the image by using semantic association information between pixel points, performing global optimization for a prediction result of the test image, obtaining a classification result, and realizing impervious surface extraction;

wherein:

a front-half segment of the deep convolutional network is formed by crosswise stacking a plurality of convolution layers and pooling layers to realize multi-scale feature extraction of the remote sensing image in this process, and a rear-half segment is formed by stacking corresponding unpooling layer and deconvolution layers to re-map the feature extracted by the front half segment of the network to each pixel point so that pixel-by-pixel feature extraction and category probability prediction are finally realized to obtain the image feature of each target region image;

performing the pixel-by-pixel category prediction by using the image feature obtained by extraction is implemented in the following manner: obtaining a probability that each pixel point corresponds to each terrain category by predicting a probability that each pixel point belongs to each category based on Softmax Regression;

an energy function of the conditional random field model comprises both a data item and a smooth item, the data item penalizes inconsistency between a prediction category label and a real category label, the smooth item penalizes inconsistency of adjacent pixel category labels, and the accurate impervious surface extraction is finally realized by balancing a relationship of the two items; and $x_i$ refers to a label variable of the i-th pixel and is a 0-1 vector, when a pixel corresponding to, belongs to the k-th terrain category, the k-th element $x_{i,k}$ of $x_i$ is 1, others are 0, $x=\{x_i\}_{i=1}^N$ is a label variable set, and the conditional random field model is expressed as an energy function $E(x)$ as follows:

$$E(x) = \sum_i \Psi_u(x_i) + \sum_{(i,j)\in E} \Psi_p(x_i, x_j)$$

wherein, $(i,j)\in E$ refers to that the i-th pixel and the j-th pixel are adjacent vertexes, and the data item $\Psi_u(x_i)$ constrains a distance between a label and a prediction probability $\hat{p}_{i,k}$;

$$\Psi_u(x_i)=\Sigma_{i,j}\Sigma_k x_{i,k} \ln \hat{p}_{i,k}$$

wherein the prediction probability $\hat{p}_{i,k}$ is a probability that the i-th pixel belongs to the k-th category, which is obtained by prediction; and the smooth item $\Psi_p(x_i,x_j)$ penalizes the inconsistency of labels between adjacent pixels;

$$\Psi_p(x_i,x_j)=\mu(x_i,x_j)(k^{(1)}(I_i,I_j)+\lambda k^{(2)}(I_i,I_j))$$

wherein $$\mu(x_i, x_j) = \begin{cases} 1, & x_i = x_j \\ 0, & \text{else} \end{cases}$$

refers to an indicative function of the label variables $x_i$ and $x_j$, $k^{(1)}(I_i,I_j)$ and $k^{(2)}(I_i,I_j)$ require the labels of spatially adjacent pixels to be consistent and adjacent pixel categories with consistent spectrums to be consistent respectively, $I_i$ refers to a spectrum feature of the i-th pixel point, $I_j$ refers to a spectrum feature of the j-th pixel point, and $\lambda$ is a controllable parameter.

* * * * *